Oct. 31, 1967  A. J. BRYANT  3,349,521
DEVICE FOR HOLDING ROTARY CUTTING TOOLS
Original Filed April 7, 1961  3 Sheets-Sheet 1
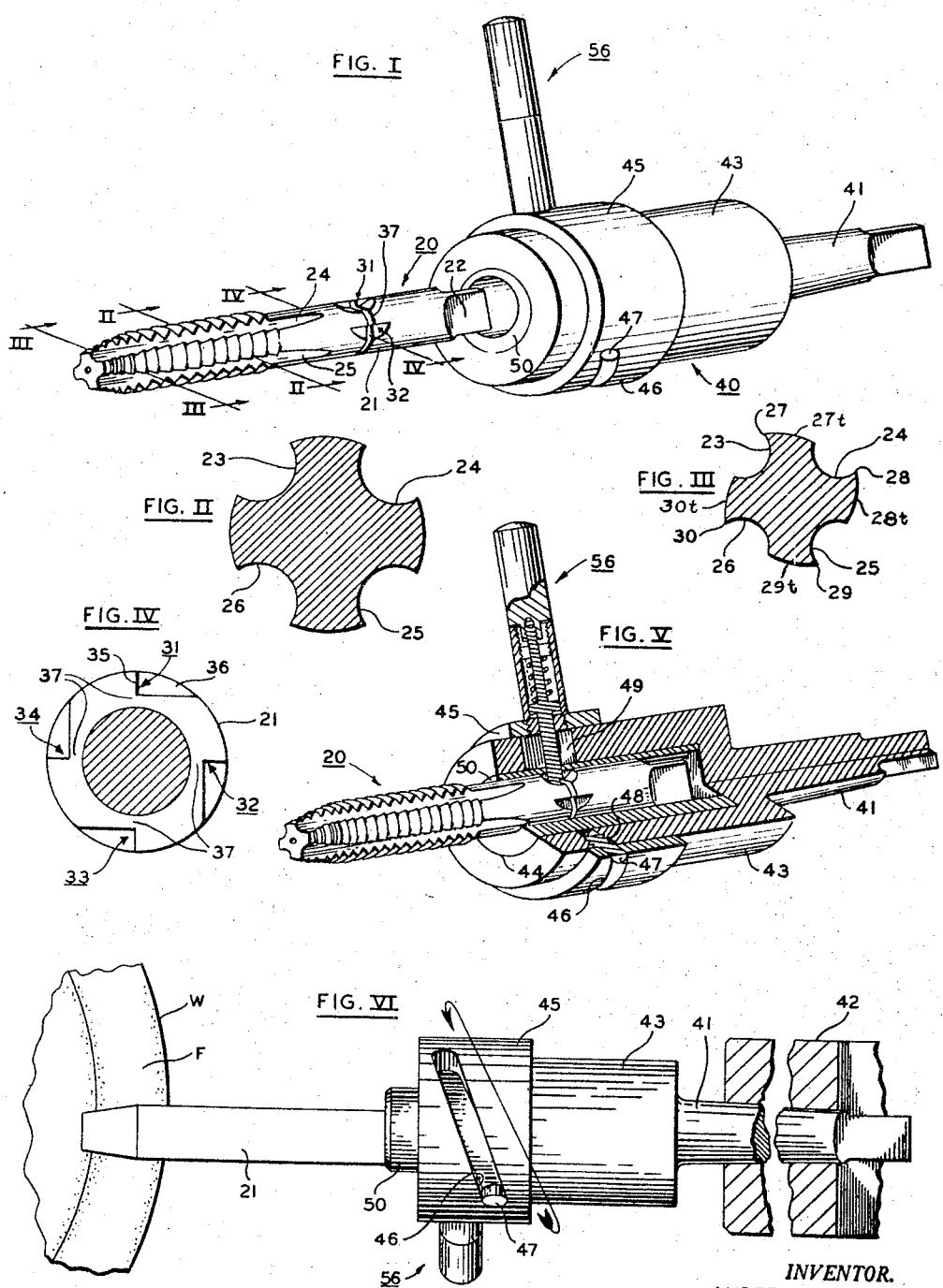
INVENTOR.
ANDREW J. BRYANT
BY
Pearce and Schaeperklaus
attys.

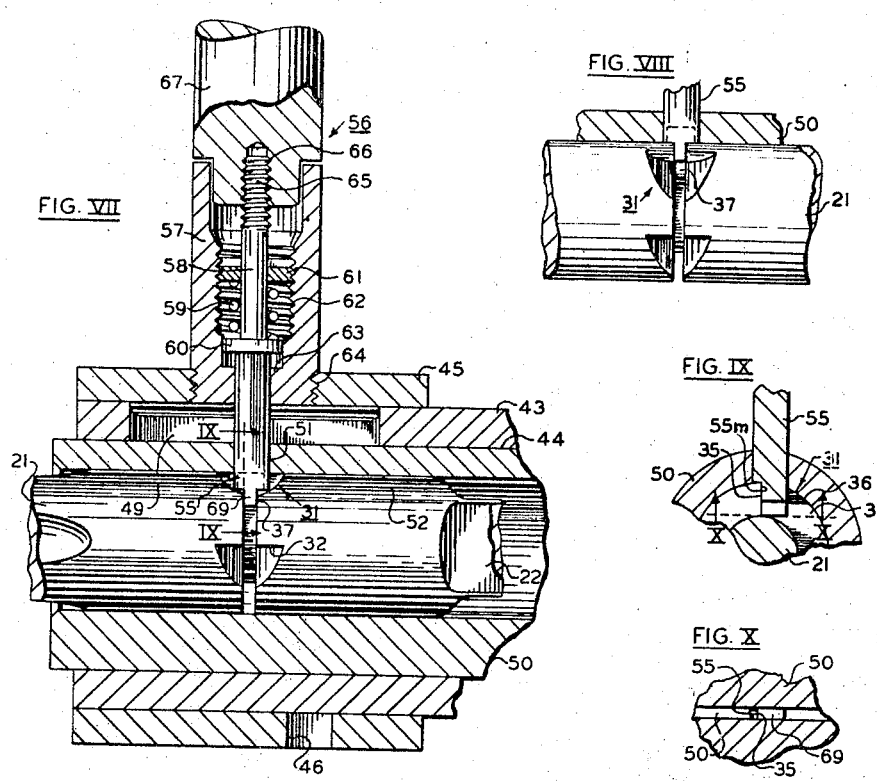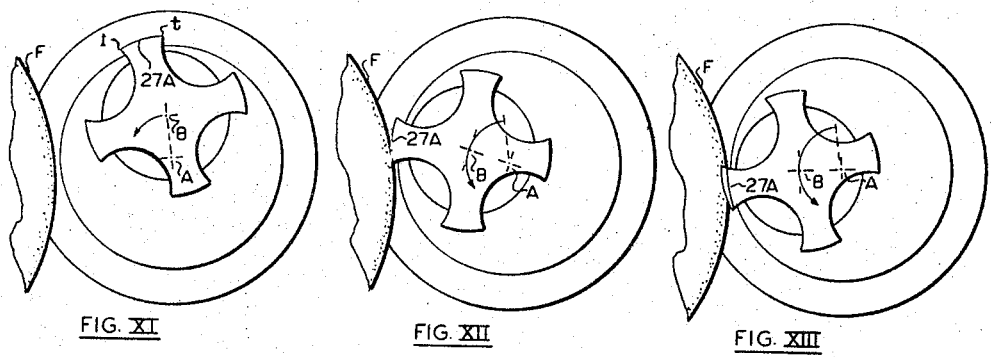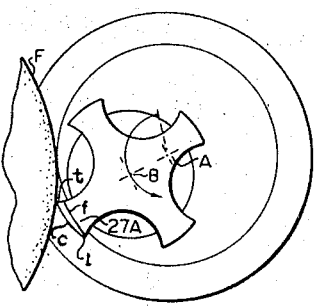

Oct. 31, 1967  A. J. BRYANT  3,349,521
DEVICE FOR HOLDING ROTARY CUTTING TOOLS
Original Filed April 7, 1961  3 Sheets-Sheet 3
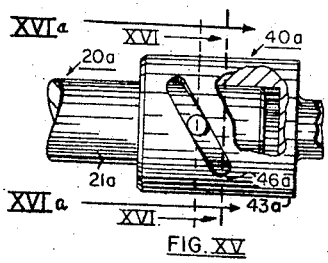
FIG. XV
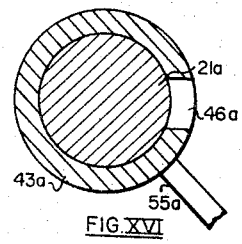
FIG. XVI
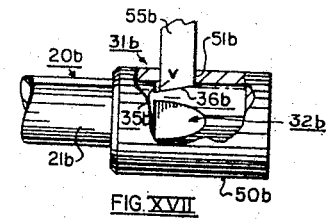
FIG. XVII
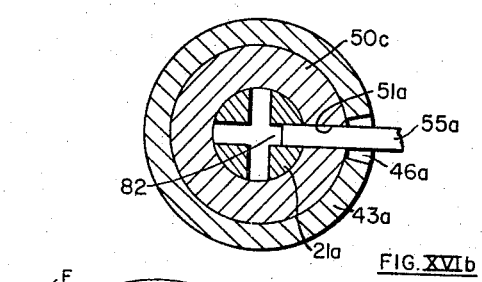
FIG. XVIb
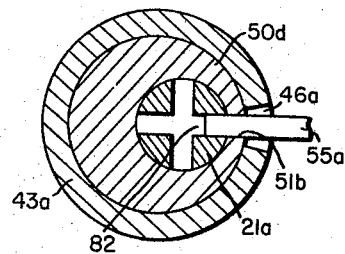
FIG. XVIc
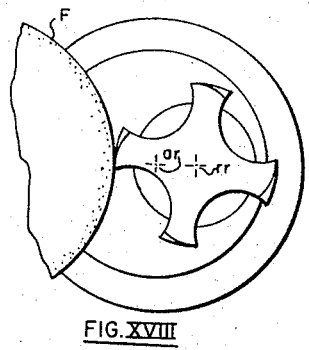
FIG. XVIII
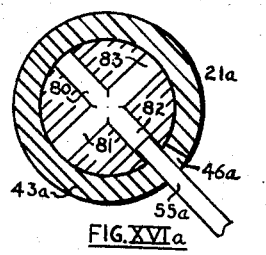
FIG. XVIa
INVENTOR.
ANDREW J. BRYANT
BY Pearce and Schaeperklaus
attys

United States Patent Office

3,349,521
Patented Oct. 31, 1967

3,349,521
DEVICE FOR HOLDING ROTARY CUTTING TOOLS
Andrew J. Bryant, 900 Arthur Ave.,
Bristol, Pa. 19007
Original application Apr. 7, 1961, Ser. No. 114,580, now Patent No. 3,190,046, dated June 22, 1965. Divided and this application June 21, 1965, Ser. No. 465,573
33 Claims. (Cl. 51—225)

This is a divisional application of my application, Ser. No. 114,580, filed Apr. 7, 1961, and which issued on June 22, 1965 as U.S. Letters Patent No. 3,190,046. The particular species of the invention disclosed in the U.S. Letters Patent No. 3,190,046 and claimed in this divisional application is illustrated by FIGS. XV, XVI, XVIa, XVIb, XVIc, XVII and as described below.

This invention relates to rotary cutting tools and devices for holding same, and in particular, to a new and improved rotary cutting tool, tap, or the like, the manufacture and sharpening thereof, and a new and improved device or workholder adapted to hold such a rotary cutting tool during the manufacture thereof or during the sharpening or grinding operation thereon.

This invention relates to a novel device for holding a rotary cutting tool, tap, or the like, during the manufacture thereof or during the sharpening or grinding operation thereon.

An ultimate object of this invention is to provide for a unique rotary cutting tool which incorporates therein cutting edges the precise nature of which accurately and exactly duplicate the profile of a thread or threads of a bolt or the like to be threaded to the tapped hole bored by the tool.

Another object of this invention is to provide for accurate, precise relief or clearance desired on the trailing surface behind each cutting edge of a rotary cutting tool.

Another object of this invention is to provide for accurate longitudinal alignment with respect to each other of a multiple number of fluted surfaces and cutting edges formed as a result of such fluted surfaces.

Another object of this invention is to provide for accurate and precise sharpening and grinding of the cutting edges in a rotary cutting tool by means incorporated in the device, whereby such sharpening and grinding are consistently reproduced.

Another object of this invention is to provide for a rotary cutting tool by which accurate regular or irregular positioning or spacing of its fluted surfaces is achieved.

A further object of this invention is to provide for indexing means or registrations within or upon a rotary cutting tool itself by which it may be precisely and successively indexed directly to the device holding same or its workholder.

Another object of this invention is to provide for a consistent reproduceable flute grind for each of the fluted surfaces on a rotary cutting tool in every grinding operation thereon, and as a result thereof, effect true symmetry of cutting edges on a rotary cutting tool.

A still further object of this invention is to provide for means on a rotary cutting tool which precisely and successively directly indexes same to the device holding it, and thereby effects true symmetry of the cutting edges upon sharpening or grinding thereof.

A further object of this invention is to provide for the incorporation of indexing means in or on a rotary cutting tool by which accurately and consistently spaced fluted surfaces are formed upon the tool therefrom, thereby effecting in subsequent grinding thereon, a precise sharpening of the cutting edges formed from the fluted surfaces.

Cutting relief or clearance on a rotary cutting tool is ordinarily provided along the trailing portion of each cutting edge formed as a result of each fluted surface formed into the tool. This relief may take the form of axial relief on each cutting edge, radial relief along the trailing portion of the cutting edge, or a combination of both for each cutting edge. Many complicated tool fixtures have been developed in the past which grind axial relief or radial relief. A cutting relief may be obtained, therefor, for each cutting edge, which will prove adequate for the general purpose of boring tap holes. However, there are a number of deficiencies in both the present-day holders and rotary cutting tools or taps which effect the tapped-hole quality, the finish thereof, and the tool or tap life itself. For example, in the case of smaller sized tap drills, ground tap drills, particularly general-purpose drills as purchased, are not consistent in respect to the flute grind. Ordinarily, upon correcting the flute grind, tapped-hole quality and tap life may be somewhat increased. Secondly, cutting pressure on the tool is ordinarily balanced between the several fluted surfaces of the tool. This balance depends upon the evenness of the spacing of the cutting edges one from another, and the cutting relief incorporated therein. This spacing in turn depends upon the spacing or accuracy of the flutes formed in the tool. Cutting pressure affects the life of the tool and the quality of the tapped hole.

An object of this invention therefore, is to provide for a constantly accurate and consistent flue grind for each rotary cutting tool that is worked upon with the novel features of this invention.

A further object of this invention is to provide for true symmetry of cutting edges in a rotary cutting tool by which a tapped hole cut by such edges has an improved finish and quality.

Another object of this invention is to provide for a predetermined effective cutting relief on a rotary cutting tool that is generated in each of the cutting edges and the trailing portions thereof, and which relief is precisely and accurately determined for and incorporated into each cutting edge and trailing portion thereof, thus precisely reflecting the desired tapped-hole size and the finish thereof. Such predetermined effective cutting relief may include merely radial relief, or merely axial relief, or a combination of radial and axial relief.

It is another object of this invention to provide for a holder for a rotary tool which includes novel features by which such predetermined effective cutting relief or clearance on the rotary cutting tool are effected, with a minimum of set-up required of the holder.

Another object of this invention is to provide for a new and improved workholder.

Another object of this invention is to provide for structure specifically designed into a device for holding a rotary cutting tool for cooperation with such tool to produce a predetermined cutting relief or clearance upon the tool.

A further object of this invention is to provide for means mounted on or associated with the holder which directly engages indexing means on a rotary cutting tool, thereby precisely indexing the tool to the holder.

Another object of this invention is to provide for a device by which a predetermined effective cutting relief is generated into a rotary cutting tool inserted therein by simple operation of the device itself upon the tool, rendering unnecessary the exercise of judgment otherwise required by the operator, whether such relief encompasses axial relief, radial relief, or a combination of both, upon the rotary tool.

Another object of this invention is to provide for a device which is of a simplified construction, and readily and easily operated by hand.

A further object of this invention is to provide for means associated with the novel device by which a tool is easily, quickly, successively and precisely, directly indexed to the device whereby predetermined, precise, accurate sharpening of each cutting edge and the trailing portion thereof on a tool is accomplished.

A still further object of this invention is to provide for a device by which true symmetry of the cutting edges of a rotary tool is retained upon regrinding of the tool therein, as the tool is successively indexed to the device for sharpening purposes.

Another object of this invention is to provide means associated with or included in the device and which cooperate with a rotary cutting tool to precised longitudinally align each of its cutting edges with respect to each other, thereby accurately effecting the true symmetry of such cutting edges.

What presently appears to be a preferred embodiment of the invention is illustrated in the accompanying drawing, particularly with respect to FIGS. XV, XVI, XVIa and XVII, in which all of the figures the same reference characters used in the following description are applied to corresponding parts in the figures in the drawing, in which:

FIG. I is a view in perspective embodying the invention, of a novel rotary cutting tool positioned preparatory to insertion thereof in a novel holder therefor;

FIG. II is a sectional view taken on line II—II of FIG. I;

FIG. III is a sectional view taken on line III—III of FIG. I, in the leading or tapered portion of the tool;

FIG. IV is a sectional view taken on line IV—IV of FIG. I;

FIG. V is a perspective view partly broken away, of the novel tool in position in the device shown in FIG. I, prior to sharpening of the tool;

FIG. VI is a view in elevation of tool and device therefor shown in FIG. I in relation to the face of a grinding wheel after a grinding operation has been performed on the tool;

FIG. VII is an enlarged fragmentary view in elevation, partly in section, of portions of the tool and device therefor shown in FIG. V;

FIG. VIII is a fragmentary elevational view, partly in section, of tool and holding device therefor;

FIG. IX is a sectional view taken on line IX—IX of FIG. VII;

FIG. X is a sectional view taken on line X—X of FIG. IX;

FIGS. XI through XIV are schematic diagrams illustrating positions of a cutting edge and its trailing portion between commencement and finishing of relief cut thereinto;

FIG. XV is a fragmentary elevational view of a modified form of tool and holding device therefor in which my invention is embodied;

FIG. XVI is a sectional view taken on line XVI—XVI of FIG. XV, with the pin rotated to an extreme position;

FIG. XVIa is a view taken on line XVIa—XVIa of FIG. XVI, with the pin rotated to an extreme position;

FIG. XVIb is a cross-sectional view, similar to that of FIG. XVIa, of a form embodying my invention;

FIG. XVIc is a cross-sectional view, similar to that of FIG. XVIa, of a form embodying my invention;

FIG. XVII is a fragmentary elevational view, partly broken away, of another modified form of my invention; and FIG. XVIII is a schematic diagram illustrating a different relationship between tool and holding device therefor than that shown in FIGS. XI–XIV, in generating relief on a tool.

A rotary cutting tool 20 and novel holding device 40 therefor and cooperating therewith, are shown in FIGS. I through X of the drawings as an illustrative embodiment of my invention.

While a four-fluted tool commonly called a tapering reamer or tap of the right-handed variety, is described as an illustrative embodiment of the invention herein disclosed, it is to be understood that the invention is capable of being adapted to fluted rotary cutting tools in general, righthanded or lefthanded, the fluted surfaces of which are adjacent the cutting edges thereof, and off of which fluted surfaces the cutting edges are generated and which tools include but are not limited to milling cutters, twist drills, taper reamers, center drills, tap drills, countersinks, step drills, valve seat cutters, core drills, hand reamers, and acme taps.

Tool 20 shown in FIGS. I through X, comprises a 4-fluted tap having a cylindrical shank 21, on one end of which a tang 22 is provided for use in holding the tap during use. From the other end of shank 21 extends a portion in which a plurality of fluted surfaces or flutes, four in this instance, 23, 24, 25, 26 as shown in FIGS. I, II, are machined or otherwise formed. Tapering of each of the flutes at the end of tape 20 opposite tang 22 results in formation of cutting edges 27, 28, 29, 30 along respective corresponding edges of each of the flute surfaces 23, 24, 25, 26, shown in FIGS. I and III. Each of the cutting edges 27, 28, 29, 30 is disposed at the intersection of a flute surface and a tool surface 27t, 28t, 29t, 30t, respectively, and has the usual series of ribs or teeth formed along the shank of tap 20. The number, size and spacing of teeth along a cutting edge depends upon the angle of chamfer, and size of tap 20.

A plurality of indexing means or abutments 31, 32, 33, 34 (FIGS. I, IV, VII), each of which is hereinafter referred to as an indexing surface or point of registry, are provided along the periphery of or otherwise incorporated into the stock or shank 21 of tap 20, preferably in the solid shank of the tap. Each particular flute 23, 24, 25, 26 is correlated to a respective indexing surface 31, 32, 33, 34.

Correlation here means the geometrical position between an indexing surface of registry and its corresponding fluted surface on the rotary tool, such that upon indexing such indexing surface of registry to device 40, its correlated fluted surface, and thus the cutting edge resulting therefrom, is so positioned in device 40 that, upon operation of device 40 in relation to grinding wheel W, such cutting edge is fed to grinding wheel W to properly sharpen same. In right-handed four-fluted tap 20, fluted surface 23 is correlated to indexing surface of registry 31. This correlation provides for a consistent and uniform grinding operation upon cutting edge 27 formed adjacent fluted surface 23 and upon tool surface or trailing portion 27t in every instance of sharpening thereon, as will be more clearly pointed out hereinafter.

Indexing abutments 31, 32, 33, 34 are substantial or exact duplicates wherefore the following description of abutment 31 is applicable to the remaining abutments as well. As shown in FIGS. I, IV, VII, surface of registry 31 comprises a flat 35 extending axially along shank 21 and radially inwardly from the periphery of shank 21 to curved base surface 36 with which such flat 35 bounds a recess or pocket formed in the body. The same formation is provided for each of the other surfaces of registry 32, 33, 34. Each of the surfaces or points of registry 31, 32, 33, 34 is precisely angularly spaced from every other surface of registry around the periphery of the tool so that precise successive indexing of 4-fluted tap 20 to device 40 may be accomplished as necessary. Four-fluted tap 20 is thus provided at exact 90° intervals about its shank with four surfaces of registry 31, 32, 33, 34 to which fluted surfaces 23, 24, 25, 26 respectively are correspondingly correlated. Thus, each flute in tap 20, being correlated to a distinct and separate surface of registry on tap 20, is correspondingly accurately spaced, each from another, in the same fashion as each surface of registry is precisely angularly spaced each from another. In a grinding operation then, tap 20 is successively indexed to each of these surfaces, and the accomplishment of total successive indexing depends, of course, on the number of flutes in the tap. By rotation and/or revolution of tap 20, with a particular surface of registry in indexed position to device 40, its corresponding fluted surface will move relative to grinding wheel W while the cutting edge formed on such fluted surface, i.e., the teeth on a cutting edge in the case of tap 20, is being "relieved" in a predetermined or calculated manner depending upon the angular position of tap 20 relatively to face F of grinding wheel W, and upon the structure associated with or incorporated into device 40 which transmits predetermined movement for tap 20 to the tap to accomplish the desired axial and radial relief. Marking of an indexing surface or point of registry, if desired will, of course, identify that surface to its corresponding flute.

Each remaining surface of registry 32, 33, 34 in tap 20 is provided for each other flute 24, 25, 26, respectively, on tap 20. As has been noted, each surface of registry 31, 32, 33, 34 is cut into tap 20 at equally spaced intervals of 90° about the periphery of its shank; however, it should be understood that each such spaced interval is dependent upon the spacing desired between each fluted surface of a rotary cutting tool, one from the other, and that it is conceivable that flute spacing may be irregular or varied from one flute to another on a particular rotary cutting tool. This in no way lessens the accuracy of a consistent flute grind in a tool embodying this invention.

Thus, in the manufacture of a particular rotary cutting tool, the surfaces or points of registry 31, 32, 33, 34 provided for the proper and accurate indexing of tool 20 to device 40, may be incorporated into the tool at predetermined or calculated intervals of space with respect to each other prior to the machining of the flutes therein. The corollary to this is that the position of each flute of the tool is regulated by the location of a respective distinct and separate surface or point of registry 31, 32, 33, 34 previously provided on the tool. In tap 20, the position of flute 23 is regulated by surface of registry 31, the position of flute 24 is regulated by surface of registry 32; and so on, with the remaining fluted surfaces being regulated by their respective, distinct and separate surfaces of registry.

As a result of this method of manufacturing tap 20, the spacing of each flute to the next flute is wholly dependent upon the spacing between such flutes' correlated surfaces of registry. Consistent grinding and regrinding is thence possible for each cutting surface and its adjacent trailing portion, when the tool is repeatedly indexed to device 40 since the way in which the tool is indexed to its holder is consistent in every grinding operation on the tool. Such a grind is generated in the tool due to this method of manufacture, when each indexing means is accurately incorporated into the tool. It may be noted here that incorporation of such indexing means is nevertheless possible in present day standard rotary tools.

Consistent, repeated and accurate axial locating or positioning of tap 20 in device 40 is made possible by an annular groove or keyway 37 formed in the tool shank perpendicular to its axis (FIGS. I, IV, VII), and located midway of the surfaces of registry 31, 32, 33, 34 provided on shank 21, and extending in greater radial depth than the respective recesses or pockets each respectively bounded in part by one of said indexing abutments. Groove or keyway 37 cooperates with a key 69, hereinafter fully described, that is axially stationary with respect to and mounted upon device 40, whereby during the successive indexing operations performed on tool 20, each of the cutting edges on the tool is properly longitudinally or axially aligned with respect to the others, during and after each cutting edge (the line of ribs or teeth in the case of tap 20) has been sharpened and relieved. Thus, true symmetry of cutting edges is effectively achieved, although correct positioning of the surfaces of registry on tap 20 to device 40 also assures such symmetry where groove 37 is not provided in the tool.

Tap 20 is held in novel device 40 for the purpose of consistently grinding with preciseness and accuracy each of its cutting edges and trailing portions thereof, duplicating exactly the original required or precise relief desired in the tool. As shown in FIGS. I, V, VI, VII, holder 40 comprises a solid tapering shaft 41 that, during use, is adapted to be securely held during a sharpening or grinding operation, in a jaw chuck, tail stock, fixture, or other suitable holding means such as is shown at 42 (FIG. VI). Shaft 41 has an integral hollow cylindrical spindle or arbor 43 in which concentric bore 44 is provided therein and about which cylindrical sleeve 45 is mounted and freely rotatably thereabouts within limits as will be hereinafter described. The axis of sleeve 45 is coincident with that of spindle 43. Sleeve 45 (FIGS. V, VII) defines an elongated, arcuate helical slot 46 against a bounding face or faces of which cam follower 47, securely fastened to and projecting from a fixed position on the outer periphery of spindle 43, abuts. Cam follower 47 comprises a post stud, the lower half of which is threaded (FIG. V) and screwed into a radially extending, internally threaded bore 48 in spindle 43 after sleeve 45 has been mounted upon spindle 43 with its slot 46 disposed in registry with bore 48. Thus, sleeve 45 is rotatable about the axis of spindle 43 and displaceable longitudinally of spindle 43 to the extent of the arcuate and axial length of helical slot 46 in which stud 47 cooperatingly projects. In FIG. VI sleeve 45 is shown (by the arrow) to be advanced fully to the left along spindle 43, in the corresponding limit of rotation established by stud 47 and slot 46. Were the helix angle in slot 46 0°, i.e., if the arcuate longitudinal axis of slot 46 were to lie in a right, cross-sectional plane of sleeve 45, then, of course, sleeve 45 would merely rotate or advance angularly about spindle 43 to the extent of the arcuate length of slot 46, and not axially advance to the left nor retract to the right along spindle 43.

Spindle 43 further defines an arcuate or clearance opening 49, as seen in FIGS. V and VII, and which is preferably rectangular in appearance upon the cylindrical surface of spindle 43. The peripheral extent of arcuate opening 49 subtends an angle, the vertex of which is at the axis of the spindle 43, and the magnitude of which precludes interference between the bounding surfaces of arcuate opening 49 in spindle 43 and a pin 55 mounted on the sleeve 45 rotating within limits established by cooperation of stud 47 with slot 46. The axial length of opening 49 (see in FIG. VII), which may be measured along the straight line that generates bore 44 about the axis of spindle 43, is similarly related to the axial distance through which sleeve 45 may be axially moved along spindle 43 within limits established by stud 47 received in slot 46. Arcuate opening 49 in spindle 43 provides access for means 55 which locks and indexes tap 20 directly to holder 40 for accurate and successive indexing of the tap. In the actual manufacture of spindle 43, the opening 49 may be made somewhat larger than the minimum dimensional requirements stated above, in order to provide ease of movement of sleeve 45 upon spindle 43 and consequently, of the advancement and retraction of the tool upon rotation of the sleeve.

Means is provided within concentric bore 44 to receive the tool 20. An eccentric bushing or adaptor 50 is slidably received and freely movable within the open forward end of bore 44 in spindle 43, and is provided with an aperture 51 (FIG. VII). In the immediate embodiment, aperture 51 radially extends through the thinner portion of the bushing, i.e. the portion of the casing of the bushing where its wall thickness is at a minimum due to the eccentric location of bore 52 in 50. The axis of the outer right cylindrical surface of bushing 50 in the illustrative embodiment is coincident with the axes of spindle 43 and sleeve 45, whereas the axis of the internal cylindrical bore 52 of bushing 50 is spaced from and parallel to said axes. It is to be noted that eccentric or concentric bushings of various internal diameters can be held within workholder 40 in order to accommodate various size tools or taps for radial and axial relief thereon.

Means or indexing pin 55 which cooperates with tap 20 to index same, is associated with holder 40, and in the instant embodiment (FIGS. V, VII) is preferably included as part of a plunger mechanism housed in a handle 56 fixedly mounted on sleeve 45 of holder 40. Indexing pin 55 extends radially through sleeve 45, arcuate opening 49 defined in spindle 43, aperture 51 in bushing 50, and projects into bore 52 of the bushing so that, upon insertion of tap 20 into the bushing, indexing pin 55 is capable of engaging or registering directly with a surface or point of registry incorporated therein. Aperture 51 in adaptor 50 is of a slip-fit size or diameter in relation to the size or diameter of indexing pin 55 for unison movement to provide a fixed relationship between adaptor and tool 20 during grinding of the latter. In this member, the eccentricity of bushing 50 directly affects the ground surface configuration of tap 20. Thus, the extent and/or type of movement during a grinding operation is the same for both adaptor 50 and tap 20 when the movement corresponds to the rotational and/or eccentric movement provided by bushing 50, and the movement thereof is limited to or otherwise corresponds to the extent and/or type of movement provided for sleeve 45 by means of the limits established by slot 46 riding on stud 47.

Indexing pin 55 constitutes an extension of plunger 58 included in handle 56, and by operation of the upper portion of the handle, is capable of being reciprocably guided to and from any one of the surfaces or points of registry incorporated within tap 20. The lower section 57 of handle 56 houses the plunger mechanism comprising a plunger 58 about which is mounted a spring 59 held thereabouts under compression between an integral collar 60 on plunger 58 and a slip-fit nut or retainer 61 fixedly threaded to the internally-threaded bore 62 of lower portion 57. Collar 60 is thus normally biased towards an annular boss 63 radially mounted internally adjacent the one end of lower portion 57, which said end is threaded and fixedly secured to a threaded aperture 64 in sleeve 45. The other end of plunger 58 is threaded as at 65 and screwed into a threaded bore 66 of the reduced lower end of upper portion 67 of the handle. Thus, indexing pin 55 is normally spring-biased towards and projects into bore 52 of adaptor 50, and reciprocably moves from bore 52 by a force applied to the plunger and indexing pin against the bias applied by spring 59.

During the successive indexing of tap 20 to holder 40, it will be clearly seen from an explanation of operation which follows, that indexing pin 55 is easily actuated by rotation of tap 20 whether or not lower and upper portions 57, 67 of handle 56 are tightly or loosely held together by means of threaded end 65 of plunger 58 and threaded bore 66 of portion 67.

A key 69 is provided at the end of indexing pin 55, which key is adapted to cooperate with or engage annular groove or keyway 37 located midway between surfaces of registry 31, 32, 33, 34 in tap 20, thereby axially positioning tap 20 to its holder 40, whereby the chamfered length of each cutting edge of tap 20 is consistently and precisely grindable to the same profile or configuration for each cutting edge of a given tool during successive indexing operations on the tool. It should be obvious and clear that annular groove 37 and key 69 therefor, need not necessarily be integral with or particularly related to indexing pin 55 and/or the surfaces of registration on tap 20. A key such as 37 may be stationarily mounted elsewhere on holder 40 or on an adaptor such as 50, so as to radially project into the bores of spindle 43 or adaptor 50, whichever may be the case, and which would engage an annular keyway or groove formed upon and at an advantageous point along the shank of a rotary cutting tool.

The operation of consistently and accurately sharpening a rotary cutting tool by this invention is readily, easily and quickly accomplished, with a minimum of set-up compared to other more complicated workholder fixtures. Cutting tool 20 is slidably inserted into adaptor 50 in the bore of spindle 43. Tang 22 passes indexing pin 55 and key 69 by simply rotating the tang out of contact therewith. The pin and key then engage shank 21 at a point where the shank and a side of the tang meet. A quick rotating turn of the tool and a slight thrusting pressure will allow advance of the tool further into bore 52, as shank 21 forces retraction of pin 55 and key 69 from bore 52, while compressing spring 59 at the same time. By further advance of the tool into the spindle, key 69 quickly finds and engages annular groove 37 provided in tap 20 (FIG. VIII), dropping thereinto to axially position the tool. Further hand rotation of the tool brings indexing pin 55 into cooperative engagement or registration with surface of registry 31, as shown in FIG. VII. FIG. VII shows that collar 60 does not seat upon annular boss 63 after indexing pin 55 has properly engaged surfaces of registry 31, so that as much benefit of the expansive strength of spring 59 is available as possible to lock pin and surface together. FIGS. IX and X show that indexing pin 55 is modified as at 55m whereby side 55m thereof registers with flat 35 of surface or registration 31 to ensure a positive locking of indexing pin 55 to indexing means 31. The pocket or recess bottom 36 acts as a camming surface on indexing pin 55 during rotation of tap 20 to its next successive indexing position. In counter clockwise rotation of tap 20, as viewed in FIG. IX, indexing pin 55 will ride on bottom 36, and thereafter upon the surface of shank 21 until indexing pin 55 drops into the next surface of registration 32, key 69 remaining in annular groove 37. The tool may then be rotated clockwise until side 55m lockingly abuts flat 35.

After each indexing, tap 20 is fed at a desired chamfer angle to face F of grinding wheel W (FIG. VI). By rotating handle 56 about spindle 43, sleeve 45 follows stud or cam follower 47, advancing bushing 50 and tap 20 together across face F (to the left in FIG. VI). Simultaneously the axis of tap 20 rotates coincidentally with the axis of the internal bore of eccentric bushing 50, and therefore, revolves about the axis of spindle 43, radially moving perpendicularly into the plane of face F as it is being rotated forwardly across face F. After each indexing step and grinding operation on tap 20, holder 40 is retracted from its advanced position to its initial position, after which pin 55 is cammed to the remaining surfaces or points of registry 33, 34, 35 mounted on tap 20, and the same precise, accurate movement of the portions of the cutting edges of tap 20 across and into face F is reproduced, since each flute of tap 20 has been correlated to a particular surface of registry that was manufactured or otherwise incorporated into the tool itself.

The grinding action for successively obtaining a predetermined relief on a cutting edge of tap 20 is illustrated by schematic FIGS. XI through XIV, where the turning axis of spindle 43 is indicated at A and the axis of tap 20, coincident with the axis of the bore of eccentric bushing 50 in spindle 43, is indicated at B. The entire length of the desired chamfer for tap 20 is aligned parallel with the plane of face F so that all teeth of the cutting edge of tap 20 strike face F simultaneously. Handle 56 on sleeve 45 and indexing pin 55 in handle 56 are rotated, thereby rotating bushing 50 in the bore of spindle 43, and revolving tap 20 and its cutting edge 27 about axis A. Tooth 27A moves from the position shown in FIG. XI to that shown in FIG. XII, and further to the positions shown in FIGS. XIII and XIV, as handle 56 on sleeve 45 is rotated throughout the entire arcuate length determined by stud 47 and arcuate slot 46 in sleeve 45. The radial relief generated on tooth 27A, due to the eccentricity of bushing 50 in spindle 43 is indicated by the radial clearance between the lines *c* and *f* on tooth 27A in FIG. XIV, where line *c* represents the periphery of tooth 27A at the commencement of grinding thereof shown in FIG. XI, and *f* represents the periphery of tooth 27A at the finish of the grinding operation shown in FIG. XIV.

It is to be remembered that as radial relief is being generated upon tooth 27A, cutting edge 27 is being longitudinally advanced across face F of the grinding wheel W, such advancement being determined by the helical nature and design of slot 46 on spindle 43. Thus, looking at FIGS. XI through XIV, the lead end of the tool is advanced axially and towards the reader as it is revolved into face F. The leading edge 1 of tooth 27A and of each other tooth of tap 20 is rotated downwardly out of engagement with face F, and the remaining width of each tooth (into the drawing sheet, i.e.) towards its trailing edge *t* (which contacts face F) is being axially relieved. The axial movement of tooth 27A does not impair or shorten the desired radial relief that is being incorporated into tooth 27A, extending from the leading edge 1 of tooth 27A to its trailing edge *t*, as a result of the eccentricity built into bushing 50. The net relief obtained on tooth 27A during the grinding operation thereon, therefore, is a combination of a continuing deepening radical relief into the thickness of tooth 27A from its leading edge 1 towards its trailing edge *t*, due to the eccentricity designed into bushing 50, and a corresponding axial relief being generated across or along the width of tooth 27A thereon, that is, with minimum tool diameter at the lead end of tool 20 and with greater diameter between the lead end and the shank 21, due to the helical nature of slot 46 in sleeve 45.

What relief has been generated for tooth 27A as described above is the exact same relief generated for every other tooth along the chamfer of cutting edge 27 that is fed to face F of the grinding wheel.

The relief generated into cutting edge 27 is a predetermined, constant, effective cutting relief desired for tap 20. The true measurement of such relief is now apparent to be dependent upon the helical nature of slot 46 in sleeve 45 and the eccentrically located bushing 50. The structures of holder 40 and bushing 50 include the mathematically-calculated or predetermined cutting relief in the form of the nature of and the bounding limits of slot 46 with stud 47 and the eccentricity formed in bushing 50. In this manner, a true measurement of effective cutting relief is accomplished and is transferred directly to tap 20 in the grinding and regrinding thereon. The natures of slot 46 and bushing 50 are, of course, computed by well-known methods used in cam design.

Thus, the nature of the threads of a bolt, shaft, or the like, having been calculated or being otherwise known, holder 40 is designed to include therein, by means of a particular slot 46 and a particular eccentric bushing 50, a nature precisely corresponding to the spacings between the threads of a threaded bolt, whereby the tapped-hole finish in the bored hole will mesh perfectly with the threads of the bolt to effect a connection having no unnecessary or undue stress or strain imposed on, between, or in, the threads of the hole and threads of the bolt threaded therein due to the torque applied to the bolt upon tightening thereof in the hole.

The following description is directed to the species disclosed in FIGS. XV, XVI and XVI*a*, and which is claimed in this divisional application that also contains generic claims to the invention.

FIGS. XV, XVI and XVI*a* show a shank of a tool 20*a* having surfaces of registry provided along the cylindrical walls of bores 80, 81, 82, 83 therein, the diameters of which are equal and whose respective axes lie wholly within a plane perpendicular to the tool axis, and whose orifices correspond to the same number of fluted surfaces of the tool. These bores, of course, are radially spaced about shank 21*a*, and each particular tool flute machined into tool 20*a* is correlated to a separate and distinct one of the orifices of a bore as was similarly seen in the case of surfaces of registry 31, 32, 33, 34 to flutes 27, 28, 29, 30, respectively in tap 20. The plane in which the axes of the bores lie acts as the means by which the plurality of cutting edges of the tool are axially aligned. An arcuate helical slot 46*a* is provided in a spindle 43*a* of a holder 40*a* in a similar manner as in the case of slot 46 in sleeve 45 of holder 40. An indexing pin 55*a* extends through slot 46*a* and projects into the orifice of bore 82 to register therewith, thereby indexing tool 20*a* to holder 40*a*. To accomplish successive indexing of tool 20*a* after one grinding operation has been completed thereon, pin 55*a* is removed from bore 82, the tool rotated to expose the orifice of the next bore, and the pin inserted therein. Axial relief is generated along each cutting edge of tool 20*a* as indexing pin 55*a* is moved across the length of arcuate helical slot 46*a*.

FIG. XVII shows the use of a "whistle notch" type of registry 31*b* in a shank 21*b* of a tool 20*b*. Flat 35*b* extends radially inwardly of shank 21*b* while plane surface or bottom 36*b* of the recess formed lies wholly in a plane which proceeds at an angle from flat 35*b* to the periphery of shank 21*b*. Indexing pin 55*b* is so configurated as to have its end be exactly accommodated to or registered upon the bottom 36*b* made in shank 21*b* after being slip-fitted through an aperture 51*b* of an eccentric 50*b* similar to bushing 50. A small void *v* exists between flat 35*b* and the side of pin 55*b*, if such is desired. The base of tool 20*b* engages the bottom of the bore of bushing 51*b* in order to axially align the tool's fluted surfaces with respect to each other. Similar "whistle notch" registries to that of registry 31*b* are provided about shank 21*b*, such as shown at 32*b*, the number and spacing depending, of course, on the number and spacing of the fluted surfaces in tool 20*b*.

It should be noted that in each of the embodiments of the invention disclosed herein, the tool may be axially positioned against the bottom of the bore of the particular spindle or bushing in which it is inserted were not other means, such as annular groove 37, used to determine axial alignment of the cutting edges on a rotary tool during a grinding operation.

The incorporation of surfaces of registration into standard rotary cutting tools is possible by incorporating such surfaces into the tool, each one incorporated with respect to a particular fluted surface of the tool, thereby making it possible to correct and provide for a consistent accurate grind upon the cutting edges and their respective trailing portions, which grind will also include a true measurement of the effective cutting relief that is inherent in the novel structure of the tool holding device disclosed herein.

FIG. XVIII represents a different technique of sharpening tools by which the invention is also capable of being practiced. Comparing FIG. XVIII to FIGS. XI through XIV, it will be seen that in FIG. XVIII the axis of revolution *ar* of a tool lies between the grinding face F and the axis of rotation *rr* of the tool, during a grinding cycle. A somewhat different form of clearance or relief for each of the cutting edges of the tool is thus generated in this technique as compared to that shown in FIGS. XI through XIV in which the positions of the above mentioned axes of revolution and rotation are reversed, since the radius of revolution *ar* of the tool is shorter than that shown in FIGS. XI–XIV.

The invention has been described in relation to a tap drill in which the fluted surfaces therein extend substantially the length of the stock or shank of the tap drill. A series of teeth or ribs are incorporated in the shank of the tap drill along substantially the entire length of the fluted surface. The shank is chamfered along the end of each of its fluted surfaces to provide for the cutting edges on the tool. However, in other tools to which the invention is adaptable, the fluted surfaces thereof may be found only in the actual cutting portion of the tool. For example, in a counter-sink drill, the fluted surfaces may be limited to the cutting portion thereof, and do not extend substantially along the stock or shank thereof. Nevertheless, in such instances, these fluted surfaces can be correlated to their respective surfaces of registry incorporated into the particular tool in the various ways as was described above, and it should be understood that, therefore, this invention may be practiced upon any rotary cutting tool having fluted surfaces therein.

The invention is also capable of being practiced upon a brazed construction of a carbide rotary cutting tool. For example, in a countersink tool, its fluted surfaces in its cutting portion are formed therein, after which a carbide cutting element of suitable thickness is brazed to each of the fluted surfaces. After the brazing process has been completed, and before relief is generated into the carbide cutting elements, a surface of registry corresponding to each carbide element may then be incorporated into the shank of the countersink drill whereby the brazing element is then accurately relieved consistently thereafter in accordance with the principles of the invention disclosed herein.

It should be understood, and which, it is believed to be, is in accordance with knowledge in the art with respect to the use of and interchangeability between an eccentric bushing and a concentric bushing in spindle or other bores, depending on the desire to obtain a radial and/or axial relief or clearance on a particularly sized tool, that either eccentric or concentric means or bushings may be disposed in the bore of spindle 43a shown in FIG. XV in the same manner as eccentric means 50 is disposed in spindle 43 shown in FIGS. V, VII. Such eccentric or concentric means is provided, of course, with a slip-fit aperture so that pin 55a mounted on or associated with spindle member 43a (such pin 55a constituting means independently of the tool 20a) is capable of engaging a surface of registry on tool 20a.

As shown in FIG. XVIb, a concentric bushing 50c having a slip-fit aperture 51a for pin 55a, is disposed in the bore of spindle 43a. Pin 55a passes through aperture 51a into bore 82 of a tool 21a, or engagement with another surface of registry such as shown in FIG. XVII. As pin 55a slides along slot 46a, concentric bushing 50c rotates with tool 21a on which axial relief is obtained.

FIG. XVIc shows an eccentric bushing 50d having a slip-fit aperture 51b. Pin 55a passes through aperture 51b into bore 82 of a tool 21a, or engagement with another surface of registry such as shown in FIG. XVII. As pin 55a slides along slot 46a, eccentric bushing 50d rotates with tool 21a. In turn, tool 21a obtains radial relief on its cutting surfaces due to the displacement of its axis relative to and from the axis of spindle 43a.

It should also be understood that various changes and modifications may be made in the embodiment of my invention herein described and illustrated, in size, shape, materials and arrangement, without departing from the spirit and scope of the invention as claimed.

Therefore, what I claim as new and patentable is:

1. A device for holding a rotary cutting tool comprising in combination:
    a single cylindrical member adapted for fixed position,
    said member defining a bore and being further defined by a peripheral wall,
    said wall containing an angular helical slot communicable with said bore and with the exterior of said wall, eccentric means disposed in said bore, and
    means independently of the tool and disposed in said angular slot and projecting through said eccentric means for engaging a surface of registry of a tool within said bore,
    said length of said slot being of greater magnitude than the size of said means disposed therein so as to provide relative angular movement between said means and said member,
    whereby actuation of said means along said slot produces eccentric rotation and axial movement of the tool as a result of cooperative action of said eccentric means and said means with the tool.

2. A device for holding a rotary cutting tool comprising in combination:
    a single cylindrical member adapted for fixed position,
    said member defining a bore and being further defined by a peripheral wall,
    said wall containing an angular slot communicable with said bore and with the exterior of said wall,
    an eccentric bushing having an aperture therein and being slidably received and freely movable in said bore, and
    means independently of the tool and disposed in said angular slot and projecting through said aperture to engage a surface of registry in a tool disposed in said bushing, said aperture being slip-fitted with said means,
    said length of said slot being of greater magnitude than the size of said means disposed therein so as to provide relative angular movement between said means and said member,
    whereby actuation of said means along said slot produces an eccentric rotation of the tool as a result of cooperative action of said eccentric bushing and said means with the tool.

3. A device for holding a rotary cutting tool comprising in combination:
    a single cylindrical member adapted for fixed position,
    said member defining a bore and being further defined by a peripheral wall,
    said wall containing an angular slot communicable with said bore and with the exterior of said wall,
    an eccentric bushing having an aperture therein and being slidably received and freely movable in said bore, and
    means independently of the tool and disposed in said angular slot and projecting through said aperture to engage a surface of registry in a tool disposed in said bushing, said aperture being slip-fitted with said means,
    said length of said slot being of greater magnitude than the size of said means disposed therein, the width of said means in said slot substantially the same as the width of said slot, so as to provide relative angular movement between said means and said member,
    whereby actuation of said means along said slot produces an eccentric rotation of the tool as a result of cooperative action of said eccentric bushing and said means with the tool.

4. A device for holding a rotary cutting tool comprising in combination:
    a single cylindrical member adapted for fixed position,
    said member defining a bore and being further defined by a peripheral wall extending parallel to the longitudinal axis of said member,
    said wall containing an angular slot communicable with said bore and with the exterior of said wall,
    an eccentric bushing having an aperture therein and being slidably received and freely movable in said bore, and
    means independently of the tool and disposed in said angular slot and projecting through said aperture to engage a surface of registry in a tool disposed in said bushing, said aperture being slip-fitted with said means,
    said length of said slot being of greater magnitude than the size of said means disposed therein so as to provide relative angular movement between said means and said member,
    whereby actuation of said means along said slot produces an eccentric rotation of the tool as a result of cooperative action of said eccentric bushing and said means with the tool.

5. A device for holding a rotary cutting tool comprising in combination:
a single cylindrical member adapted for fixed position, said member defining a bore and being further defined by a peripheral wall extending parallel to the longitudinal axis of said member,
said wall containing an angular slot communicable with said bore and with the exterior of said wall,
an eccentric bushing having an aperture therein and being slidably received and freely movable in said bore, and
means independently of the tool and disposed in said angular slot and projecting through said aperture to engage a surface of registry in a tool disposed in said bushing, said aperture being slip-fitted with said means,
said length of said slot being of greater magnitude than the size of said means disposed therein, the width of said means in said slot substantially the same as the width of said slot, so as to provide relative angular movement between said means and said member,
whereby actuation of said means along said slot produces an eccentric rotation of the tool as a result of cooperative action of said eccentric bushing and said means with the tool.

6. A device for holding a rotary cutting tool comprising in combination:
a single cylindrical member adapted for fixed position at its one end,
said member defining a bore inwardly from its other end thereof and being further defined by a peripheral wall between its ends and a base at its end adapted for fixed position limiting the extent of said bore,
said wall containing an angular slot communicable with said bore and with the exterior of said wall,
an eccentric bushing having an aperture therein and being slidably received and freely movable in said bore, and
means independently of the tool and disposed in said angular slot and projecting through said aperture to engage a surface of registry in a tool disposed in said bushing, said aperture being slip-fitted with said means,
said length of said slot being of greater magnitude than the size of said means disposed therein so as to provide relative movement between said means and said member,
whereby actuation of said means along said slot produces an eccentric rotation of the tool as a result of cooperative action of said eccentric bushing and said means with the tool.

7. A device for holding a rotary cutting tool comprising in combination:
a single cylindrical member adapted for fixed position at its one end,
said member defining a bore inwardly from its other end thereof and being further defined by a peripheral wall between its ends and a base at its end adapted for fixed position limiting the extent of said bore,
said wall extending parallel to the longitudinal axis of said member,
said wall containing an angular slot communicable with said bore and with the exterior of said wall,
an eccentric bushing having an aperture therein and being slidably received and freely movable in said bore, and
means independently of the tool and disposed in said angular slot and projecting through said aperture to engage a surface of registry in a tool disposed in said bushing, said aperture being slip-fitted with said means,
said length of said slot being of greater magnitude than the size of said means disposed therein so as to provide relative angular movement between said means and said member,
whereby actuation of said means along said slot produces an eccentric rotation of the tool as a result of cooperative action of said eccentric bushing and said means with the tool.

8. A device for holding a rotary cutting tool comprising in combination:
a single cylindrical member adapted for fixed position at its one end,
said member defining a bore inwardly from its other end thereof and being further defined by a peripheral wall between its ends and a base at its end adapted for fixed position limiting the extent of said bore,
said wall extending parallel to the longitudinal axis of said member,
said wall containing an angular slot communicable with said bore and with the exterior of said wall,
an eccentric bushing having an aperture therein and being slidably received and freely movable in said bore, and
means independently of the tool and disposed in said angular slot and projecting through said aperture to engage a surface of registry in a tool disposed in said bushing, said aperture being slip-fitted with said means,
said length of said slot being of greater magnitude than the size of said means disposed therein, the width of said means substantially the same as the width of said slot, so as to provide relative angular movement between said means and said member,
whereby actuation of said means along said slot produces an eccentric rotation of the tool as a result of cooperative action of said eccentric bushing and said means with the tool.

9. A device for holding a rotary cutting tool comprising in combination:
a single cylindrical member adapted for fixed position at its one end,
said member defining a bore inwardly from its other end thereof and being further defined by a peripheral wall between its end and a base at its end adapted for fixed position limiting the extent of said bore,
said wall containing an angular slot communicable with said bore and with the exterior of said wall,
an eccentric bushing having an aperture therein and being slidably received and freely movable in said bore, and
means independently of the tool and disposed in said angular slot and projecting through said aperture to engage a surface of registry in a tool disposed in said bushing,
said aperture being slip-fitted with said means,
said length of said slot being of greater magnitude than the size of said means disposed therein, the width of said means substantially the same as the width of said slot, so as to provide relative angular movement between said means and said member,
whereby actuation of said means along said slot produces an eccentric rotation of the tool as a result of cooperative action of said eccentric bushing and said means with the tool.

10. A device for holding a rotary cutting tool comprising in combination:
a single cylindrical member adapted for fixed position, said member defining a bore and being further defined by a peripheral wall,
said wall containing an angular slot communicable with said bore and with the exterior of said wall,
an eccentric bushing having an aperture therein and being slidably received and freely movable in said bore, and
means mounted on said member and disposed in said angular slot and projecting through said aperture to engage a surface of registry in a tool disposed in said bushing,
said aperture being slip-fitted with said means, said length of said slot being of greater magnitude than the size of said means disposed therein so as to provide relative angular movement between said means mounted on said member and said member, whereby actuation of said means mounted on said member along said slot produces an eccentric rotation of the tool as a result of cooperative action of said eccentric bushing and said means with the tool.

11. A device for holding a rotary cutting tool comprising in combination:

a single cylindrical member adapted for fixed position, said member defining a bore and being further defined by a peripheral wall, said wall containing an angular slot communicable with said bore and with the exterior of said wall, an eccentric bushing having an aperture therein and being slidably received and freely movable in said bore, and means mounted on said member and disposed in said angular slot and projecting through said aperture to engage a surface of registry in a tool disposed in said bushing, said aperture being slip-fitted with said means, said length of said slot being of greater magnitude than the size of said means disposed therein, the width of said means in said slot substantially the same as the width of said slot, so as to provide relative angular movement between said means mounted on said member and said member, whereby actuation of said means mounted on said member along said slot produces an eccentric rotation of the tool as a result of cooperative action of said eccentric bushing and said means with the tool.

12. A device for holding a rotary cutting tool comprising in combination:

a single cylindrical member adapted for fixed position, said member defining a bore and being further defined by a peripheral wall extending parallel to the longitudinal axis of said member, said wall containing an angular slot communicable with said bore and with the exterior of said wall, an eccentric bushing having an aperture therein and being slidably received and freely movable in said bore, and means mounted on said member and disposed in said angular slot and projecting through said aperture to engage a surface of registry in a tool disposed in said bushing, said aperture being slip-fitted with said means, said length of said slot being of greater magnitude than the size of said means disposed therein so as to provide relative angular movement between said means mounted on said member and said member, whereby actuation of said means mounted on said member along said slot produces an eccentric rotation of the tool as a result of cooperative action of said eccentric bushing and said means with the tool.

13. A device for holding a rotary cutting tool comprising in combination:

a single cylindrical member adapted for fixed position, said member defining a bore and being further defined by a peripheral wall extending parallel to the longitudinal axis of said member, said wall containing an angular slot communicable with said bore and with the exterior of said wall, an eccentric bushing having an aperture therein and being slidably received and freely movable in said bore, and means mounted on said member and disposed in said angular slot and projecting through said aperture to engage a surface of registry in a tool disposed in said bushing, said aperture being slip-fitted with said means, said length of said slot being of greater magnitude than the size of said means mounted on said member disposed therein, the width of said means in said slot substantially the same as the width of said slot, so as to provide relative angular movement between said means and said member, whereby actuation of said means mounted on said member along said slot produces an eccentric rotation of the tool as a result of cooperative action of said eccentric bushing and said means with the tool.

14. A device for holding a rotary cutting tool comprising in combination:

a single cylindrical member adapted for fixed position at its one end, said member defining a bore inwardly from its other end thereof and being further defined by a peripheral wall between its ends and a base at its end adapted for fixed position limiting the extent of said bore, said wall containing an angular slot communicable with said bore and with the exterior of said wall, an eccentric bushing having an aperture therein and being slidably received and freely movable in said bore, and means mounted on said member and disposed in said angular slot and projecting through said aperture to engage a surface of registry in a tool disposed in said bushing, said aperture being slip-fitted with said means, said length of said slot being of greater magnitude than the size of said means disposed therein so as to provide relative angular movement between said means mounted on said member and said member, whereby actuation of said means mounted on said member along said slot produces an eccentric rotation of the tool as a result of cooperative action of said eccentric bushing and said means with the tool.

15. A device for holding a rotary cutting tool comprising in combination:

a single cylindrical member adapted for fixed position at its one end, said member defining a bore inwardly from its other end thereof and being further defined by a peripheral wall between its ends and a base at its end adapted for fixed position limiting the extent of said bore, said wall extending parallel to the longitudinal axis of said member, said wall containing an angular slot communicable with said bore and with the exterior of said wall, an eccentric bushing having an aperture therein and being slidably received and freely movable in said bore, and means mounted on said member and disposed in said angular slot and projecting through said aperture to engage a surface of registry in a tool disposed in said bushing, said aperture being slip-fitted with said means, said length of said slot being of greater magnitude than the size of said means disposed therein so as to provide relative angular movement between said means mounted on said member and said member, whereby actuation of said means mounted on said member along said slot produces an eccentric rotation of the tool as a result of cooperative action of said eccentric bushing and said means with the tool.

16. A device for holding a rotary cutting tool comprising in combination:

a single cylindrical member adapted for fixed position at its one end, said member defining a bore inwardly from its other end thereof and being further defined by a peripheral wall between its ends and a base at its end adapted for fixed position, said wall extending parallel to the longitudinal axis of said member, said wall containing an angular slot communicable with said bore and with the exterior of said wall, an eccentric bushing having an aperture therein and being slidably received and freely movable in said bore, and means mounted on said member and disposed in said angular slot and projecting through said aperture to engage a surface of registry in a tool disposed in said bushing, said aperture being slip-fitted with said means, said length of said slot being of greater magnitude than the size of said means disposed therein, the width of said means substantially the same as the width of said slot, so as to provide relative angular movement between said means mounted on said member and said member, whereby actuation of said means mounted on said member along said slot produces an eccentric rotation of the tool as a result of cooperative action of said eccentric bushing and said means with the tool.

17. A device for holding a rotary cutting tool comprising in combination:

a single cylindrical member adapted for fixed position at its one end, said member defining a bore inwardly from its other end thereof and being further defined by a peripheral wall between its end and a base at its end adapted for fixed position limiting the extent of said bore, said wall containing an angular slot communicable with said bore and with the exterior of said wall, an eccentric bushing having an aperture therein and being slidably received and freely movable in said bore, and means mounted on said member and disposed in said angular slot and projecting through said aperture to engage a surface of registry in a tool disposed in said bushing, said aperture being slip-fitted with said means, said length of said slot being of greater magnitude than the size of said means disposed therein, the width of said means substantially the same as the width of said slot, so as to provide relative angular movement between said means mounted on said member and said member, whereby actuation of said means mounted on said member along said slot produces an eccentric rotation of the tool as a result of cooperative action of said eccentric bushing and said means with the tool.

18. A device for holding a rotary cutting tool comprising in combination:

a single cylindrical member adapted for fixed position, said member defining a bore and being further defined by a peripheral wall, said wall containing an angular helical slot communicable with said bore and with the exterior of said wall, an eccentric bushing having an aperture therein and being slidably received and freely movable in said bore, and means independently of the tool and disposed in said angular helical slot and projecting through said aperture to engage a surface of registry in a tool disposed in said bushing, said aperture being slip-fitted with said means, said length of said slot being of greater magnitude than the size of said means disposed therein so as to provide relative angular movement between said means and said member, whereby actuation of said means along said angular helical slot produces axial movement and eccentric rotation of the tool as a result of cooperative action of said eccentric bushing and said means with the tool.

19. A device for holding a rotary cutting tool comprising in combination:

a single cylindrical member adapted for fixed position, said member defining a bore and being further defined by a peripheral wall, said wall containing an angular helical slot communicable with said bore and with the exterior of said wall, an eccentric bushing having an aperture therein and being slidably received and freely movable in said bore, and means independently of the tool and disposed in said angular helical slot and projecting through said aperture to engage a surface of registry in a tool disposed in said bushing, said aperture bing slip-fitted with said means, said length of said slot being of greater magnitude than the size of said means disposed therein, the width of said means in said slot substantially the same as the width of said slot, so as to provide relative angular movement between said means and said member, whereby actuation of said means along said angular helical slot produces axial movement and eccentric rotation of the tool as a result of cooperative action of said eccentric bushing and said means with the tool.

20. A device for holding a rotary cutting tool comprising in combination:

a single cylindrical member adapted for fixed position, said member defining a bore and being further defined by a peripheral wall extending parallel to the longitudinal axis of said member, said wall containing an angular helical slot communicable with said bore and with the exterior of said wall, an eccentric bushing having an aperture therein and being slidably received and freely movable in said bore, and means independently of the tool and disposed in said angular helical slot and projecting through said aperture to engage a surface of registry in a tool disposed in said bushing, said aperture being slip-fitted with said means, said length of said slot being of greater magnitude than the size of said means disposed therein so as to provide relative angular movement between said means and said member, whereby actuation of said means along said angular helical slot produces axial movement and eccentric rotation of the tool as a result of cooperative action of said eccentric bushing and said means with the tool.

21. A device for holding a rotary cutting tool comprising in combination:

a single cylindrical member adapted for fixed position, said member defining a bore and being further defined by a peripheral wall extending parallel to the longitudinal axis of said member, said wall containing an angular helical slot communicable with said bore and with the exterior of said wall, an eccentric bushing having an aperture therein and being slidably received and freely movable in said bore, and means independently of the tool and disposed in said angular helical slot and projecting through said aperture to engage a surface of registry in a tool disposed in said bushing, said aperture being slip-fitted with said means, said length of said slot being of greater magnitude than the size of said means disposed therein, the width of said means in said slot substantially the same as the width of said slot, so as to provide relative angular movement between said means and said member, whereby actuation of said means along said angular helical slot produces axial movement and eccentric rotation of the tool as a result of cooperative action of said eccentric bushing and said means with the tool.

22. A device for holding a rotary cutting tool comprising in combination:

a single cylindrical member adapted for fixed position at its one end, said member defining a bore inwardly from its other end thereof and being further defined by a peripheral wall between its ends and a base at its end adapted for fixed position limiting the extent of said bore, said wall containing an angular helical slot communicable with said bore and with the exterior of said wall, an eccentric bushing having an aperture therein and being slidably received and freely movable in said bore, and means independently of the tool and disposed in said angular helical slot and projecting through said aperture to engage a surface of registry in a tool disposed in said bushing, said aperture being slip-fitted with said means, said length of said slot being of greater magnitude than the size of said means disposed therein so as to provide relative angular movement between said means and said member, whereby actuation of said means along said angular helical slot produces axial movement and eccentric rotation of the tool as a result of cooperative action of said eccentric bushing and said means with the tool.

23. A device for holding a rotary cutting tool comprising in combination:

a single cylindrical member adapted for fixed position at its one end, said member defining a bore inwardly from its other end thereof and being further defined by a peripheral wall between its ends and a base at its end adapted for fixed position limiting the extent of said bore, said wall extending parallel to the longitudinal axis of said member, said wall containing an angular helical slot communicable with said bore and with the exterior of said wall, an eccentric bushing having an aperture therein and being slidably received and freely movable in said bore, and means independently of the tool and disposed in said angular helical slot and projecting through said aperture to engage a surface of registry in a tool disposed in said bushing, said aperture being slip-fitted with said means, said length of said slot being of greater magnitude than the size of said means disposed therein so as to provide relative angular movement between said means and said member, whereby actuation of said means along said angular helical slot produces axial movement and eccentric rotation of the tool as a result of cooperative action of said eccentric bushing and said means with the tool.

24. A device for holding a rotary cutting tool comprising in combination:

a single cylindrical member adapted for fixed position at its one end, said member defining a bore inwardly from its other end thereof and being further defined by a peripheral wall between its ends and a base at its end adapted for fixed position, said wall extending parallel to the longitudinal axis of said member, said wall containing an angular helical slot communicable with said bore and with the etxerior of said wall, an eccentric bushing having an aperture therein and being slidably received and freely movable in said bore, and means independently of the tool and disposed in said angular helical slot and projecting through said aperture to engage a surface of registry in a tool disposed in said bushing, said aperture being slip-fitted with said means, said length of said slot being of greater magnitude than the size of said means disposed therein, the width of said means substantially the same as the width of said slot, so as to provide relative angular movement between said means and said member, whereby actuation of said means along said angular helical slot produces axial movement and eccentric rotation of the tool as a result of cooperative action of said eccentric bushing and said means with the tool.

25. A device for holding a rotary cutting tool comprising in combination:

a single cylindrical member adapted for fixed position at its one end, said member defining a bore inwardly from its other end thereof and being further defined by a peripheral wall between its end and a base at its end adapted for fixed position limiting the extent of said bore, said wall containing an angular helical slot communicable with said bore and with the exterior of said wall, an eccentric bushing having an aperture therein and being slidably received and freely movable in said bore, and means independently of the tool and disposed in said angular helical slot and projecting through said aperture to engage a surface of registry in a tool disposed in said bushing, said aperture being slip-fitted with said means, said length of said slot being of greater magnitude than the size of said means disposed therein, the width of said means substantially the same as the width of said slot, so as to provide relative angular movement between said means and said member, whereby actuation of said means along said angular helical slot produces axial movement and eccentric rotation of the tool as a result of cooperative action of said eccentric bushing and said means with the tool.

26. A device for holding a rotary cutting tool comprising in combination:

a single cylindrical member adapted for fixed position, said member defining a bore and being futrher defined by a peripheral wall, said wall containing an angular helical slot communicable with said bore and with the exterior of said wall, an eccentric bushing having an aperture therein and being slidably received and freely movable in said bore, and means mounted on said member and disposed in said angular helical slot and projecting through said aperture to engage a surface of registry in a tool disposed in said bushing, said aperture being slip-fitted with said means, said length of said slot being of greater magnitude than the size of said means disposed therein so as to provide relative angular movement between said means mounted on said member and said member, whereby actuation of said means along said angular helical slot produces axial movement and eccentric rotation of the tool as a result of cooperative action of said eccentric bushing and said means with the tool.

27. A device for holding a rotary cutting tool comprising in combination:

a single cylindrical member adapted for fixed position, said member defining a bore and being further defined by a peripheral wall, said wall containing an angular helical slot communicable with said bore and with the exterior of said wall,
an eccentric bushing having an aperture therein and being slidably received and freely movable in said bore, and
means mounted on said member and disposed in said angular helical slot and projecting through said aperture to engage a surface of registry in a tool disposed in said bushing, said aperture being slip-fitted with said means,
said length of said slot being of greater magnitude than the size of said means disposed therein, the width of said means in said slot substantially the same as the width of said slot, so as to provide relative angular movement between said means mounted on said member and said member,
whereby actuation of said means along said angular helical slot produces axial movement and eccentric rotation of the tool as a result of cooperative action of said eccentric bushing and said means with the tool.

28. A device for holding a rotary cutting tool comprising in combination:
a single cylindrical member adapted for fixed position,
said member defining a bore and being further defined by a peripheral wall extending parallel to the longitudinal axis of said member,
said wall containing an angular helical slot communicable with said bore and with the exterior of said wall,
an eccentric bushing having an aperture therein and being slidably received and freely movable in said bore, and
means mounted on said member and disposed in said angular helical slot and projecting through said aperture to engage a surface of registry in a tool disposed in said bushing, said aperture being slip-fitted with said means,
said length of said slot being of greater magnitude than the size of said means disposed therein so as to provide relative angular movement between said means mounted on said member and said member,
whereby actuation of said means along said angular helical slot produces axial movement and eccentric rotation of the tool as a result of cooperative action of said eccentric bushing and said means with the tool.

29. A device for holding a rotary cutting tool comprising in combination:
a single cylindrical member adapted for fixed position,
said member defining a bore and being further defined by a peripheral wall extending parallel to the longitudinal axis of said member,
said wall containing an angular helical slot communicable with said bore and with the exterior of said wall,
an eccentric bushing having an aperture therein and being slidably received and freely movable in said bore, and
means mounted on said member and disposing in said angular helical slot and projecting through said aperture to engage a surface of registry in a tool disposed in said bushing, said aperture being slip-fitted with said means,
said length of said slot being of greater magnitude than the size of said means disposed therein, the width of said means in said slot substantially the same as the width of said slot, so as to provide relative angular movement between said means mounted on said member and said member,
whereby actuation of said means along said angular helical slot produces axial movement and eccentric rotation of the tool as a result of cooperative action of said eccentric bushing and said means with the tool.

30. A device for holding a rotary cutting tool comprising in combination:
a single cylindrical member adapted for fixed position at its one end,
said member defining a bore inwardly from its other end thereof and being further defined by a peripheral wall between its ends and a base at its end adapted for fixed position limiting the extent of said bore,
said wall containing an angular helical slot communicable with said bore and with the exterior of said wall,
an eccentric bushing having an aperture therein and being slidably received and freely movable in said bore, and
means mounted on said member and disposed in said angular helical slot and projecting through said aperture to engage a surface of registry in a tool disposed in said bushing, said aperture being slip-fitted with said means,
said length of said slot being of greater magnitude than the size of said means disposed therein so as to provide relative angular movement between said means mounted on said member and said member,
whereby actuation of said means along said angular helical slot produces axial movement and eccentric rotation of the tool as a result of cooperative action of said eccentric bushing and said means with the tool.

31. A device for holding a rotary cutting tool comprising in combination:
a single cylindrical member adapted for fixed position at its one end, said member defining a bore inwardly from its other end thereof and being further defined by a peripheral wall between its ends and a base at its end adapted for fixed position limiting the extent of said bore,
said wall extending parallel to the longitudinal axis of said member,
said wall containing an angular helical slot communicable with said bore and with the exterior of said wall,
an eccentric bushing having an aperture therein and being slidably received and freely movable in said bore, and
means mounted on said member and disposed in said angular helical slot and projecting through said aperture to engage a surface of registry in a tool disposed in said bushing, said aperture being slip-fitted with said means,
said length of said slot being of greater magnitude than the size of said means disposed therein so as to provide relative angular movement between said means mounted on said member and said member,
whereby actuation of said means along said angular helical slot produces axial movement and eccentric rotation of the tool as a result of cooperative action of said eccentric bushing and said means with the tool.

32. A device for holding a rotary cutting tool comprising in combination:
a single cylindrical member adapted for fixed position at its one end,
said member defining a bore inwardly from its other end thereof and being further defined by a peripheral wall between its ends and a base at its end adapted for fixed position,
said wall extending parallel to the longitudinal axis of said member,
said wall containing an angular helical slot communicable with said bore and with the exterior of said wall,
an eccentric bushing having an aperture therein and being slidably received and freely movable in said bore, and
means mounted on said member and disposed in said angular helical slot and projecting through said aperture to engage a surface of registry in a tool disposed in said bushing, said aperture being slip-fitted with said means, said length of said slot being of greater magnitude than the size of said means disposed therein, the width of said means substantially the same as the width of said slot, so as to provide relative angular movement between said means mounted on said member and said member, whereby actuation of said means along said angular helical slot produces axial movement and eccentric rotation of the tool as a result of cooperative action of said eccentric bushing and said means with the tool.

33. A device for holding a rotary cutting tool comprising in combination:

a single cylindrical member adapted for fixed position at its one end, said member defining a bore inwardly from its other end thereof and being further defined by a peripheral wall between its end and a base at its end adapted for fixed position limiting the extent of said bore, said wall containing an angular helical slot communicable with said bore and with the exterior of said wall, an eccentric bushing having an aperture therein and being slidably received and freely movable in said bore, and means mounted on said member and disposed in said angular helical slot and projecting through said aperture to engage a surface of registry in a tool disposed in said bushing, said aperture being slip-fitted with said means, said length of said slot being of greater magnitude than the size of said means disposed therein, the width of said means substantially the same as the width of said slot, so as to provide relative angular movement between said means mounted on said member and said member, whereby actuation of said means along said angular helical slot produces axial movement and eccentric rotation of the tool as a result of cooperative action of said eccentric bushing and said means with the tool.

References Cited
UNITED STATES PATENTS

| | | | |
|---|---|---|---|
| 511,607 | 12/1893 | Gay | 29—103 |
| 1,202,195 | 10/1916 | Lees | 29—103 |
| 2,486,044 | 10/1949 | Lusk | 51—225 |
| 2,503,396 | 4/1950 | Lentz | 51—225 |
| 2,700,258 | 1/1955 | White | 51—225 |
| 2,859,569 | 10/1959 | Whitesel | 51—219 |
| 2,923,053 | 2/1960 | Babbitt | 29—103 |

OTHER REFERENCES

American Machinist Publication "Sensitive Drill Holder for Turret Lathe," p. 134, Feb. 10, 1937.

HAROLD D. WHITEHEAD, *Primary Examiner.*

UNITED STATES PATENT OFFICE
CERTIFICATE OF CORRECTION

Patent No. 3,349,521                      October 31, 1967

Andrew J. Bryant

It is hereby certified that error appears in the above numbered patent requiring correction and that the said Letters Patent should read as corrected below.

Column 13, line 46, after "relative" insert -- angular --; column 21, line 58, for "disposing" read -- disposed --.

Signed and sealed this 12th day of November 1968.

(SEAL)
Attest:

Edward M. Fletcher, Jr.                      EDWARD J. BRENNER

Attesting Officer                             Commissioner of Patents